United States Patent [19]
Chappell et al.

[11] Patent Number: 5,520,123
[45] Date of Patent: May 28, 1996

[54] INTELLIGENT AFTERBURNER INJECTION CONTROL TO MINIMIZE POLLUTANT EMISSIONS

[75] Inventors: Paul J. Chappell, Raleigh; Keith J. Fritsky, Chapel Hill; Paul M. Lemeiux, Cary; Charles A. Miller, Apex, all of N.C.

[73] Assignee: The United States of America as represented by the Administrator of the Environmental Protection Agency, Washington, D.C.

[21] Appl. No.: 380,871

[22] Filed: Jan. 30, 1995

[51] Int. Cl.⁶ .................................................. F23N 5/18
[52] U.S. Cl. ..................... 110/188; 110/214; 110/246; 110/345; 110/185
[58] Field of Search ..................... 110/210, 211, 110/212, 214, 246, 344, 345, 185, 191, 187, 188

[56] References Cited

U.S. PATENT DOCUMENTS

| | | |
|---|---|---|
| 4,694,418 | 9/1987 | Ueno et al. . |
| 4,716,540 | 12/1987 | Yamakawa . |
| 4,864,490 | 9/1989 | Nomoto et al. . |
| 4,914,924 | 4/1990 | Takahashi . |
| 5,001,640 | 3/1991 | Matsumoto et al. . |
| 5,021,958 | 6/1991 | Tokoro . |
| 5,203,267 | 4/1993 | Greene et al. ............................ 110/212 |
| 5,207,176 | 5/1993 | Morhard et al. ......................... 110/246 |
| 5,425,316 | 6/1995 | Malone ..................................... 110/346 |

*Primary Examiner*—Thomas E. Denion
*Attorney, Agent, or Firm*—Irving M. Freedman

[57] ABSTRACT

An intelligent oxygen injection control system for afterburners which minimizes transient incinerator pollutant emissions while simultaneously minimizing oxygen consumption. A fuzzy logic-based controller utilizes inputs from sensors that measure gas phase pollutant species such as hydrocarbons and carbon monoxide to control oxygen injection and thus minimize pollutant emissions while minimizing oxygen consumption.

14 Claims, 2 Drawing Sheets

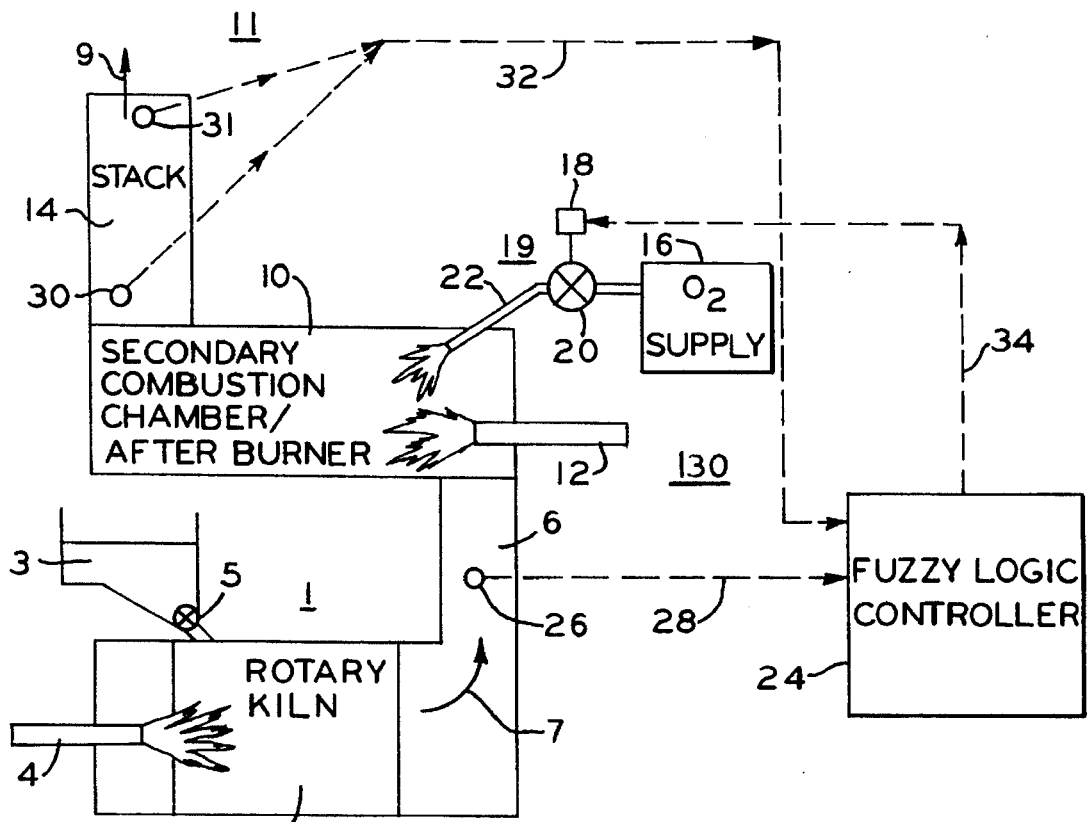
FIG_1
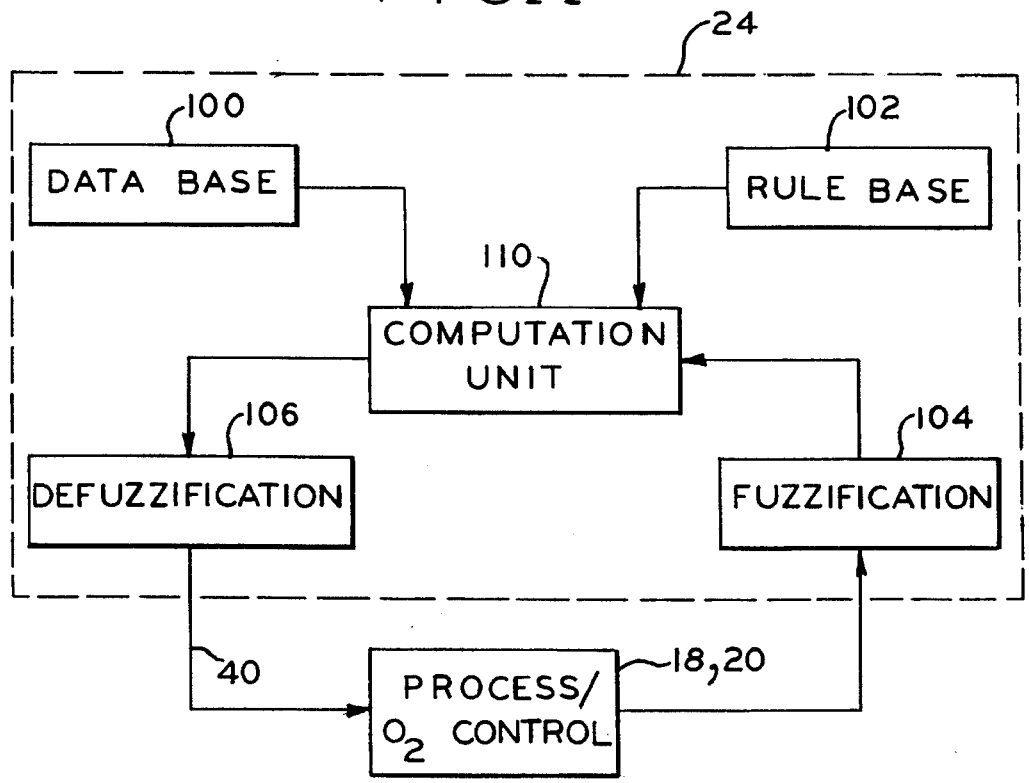
FIG_2

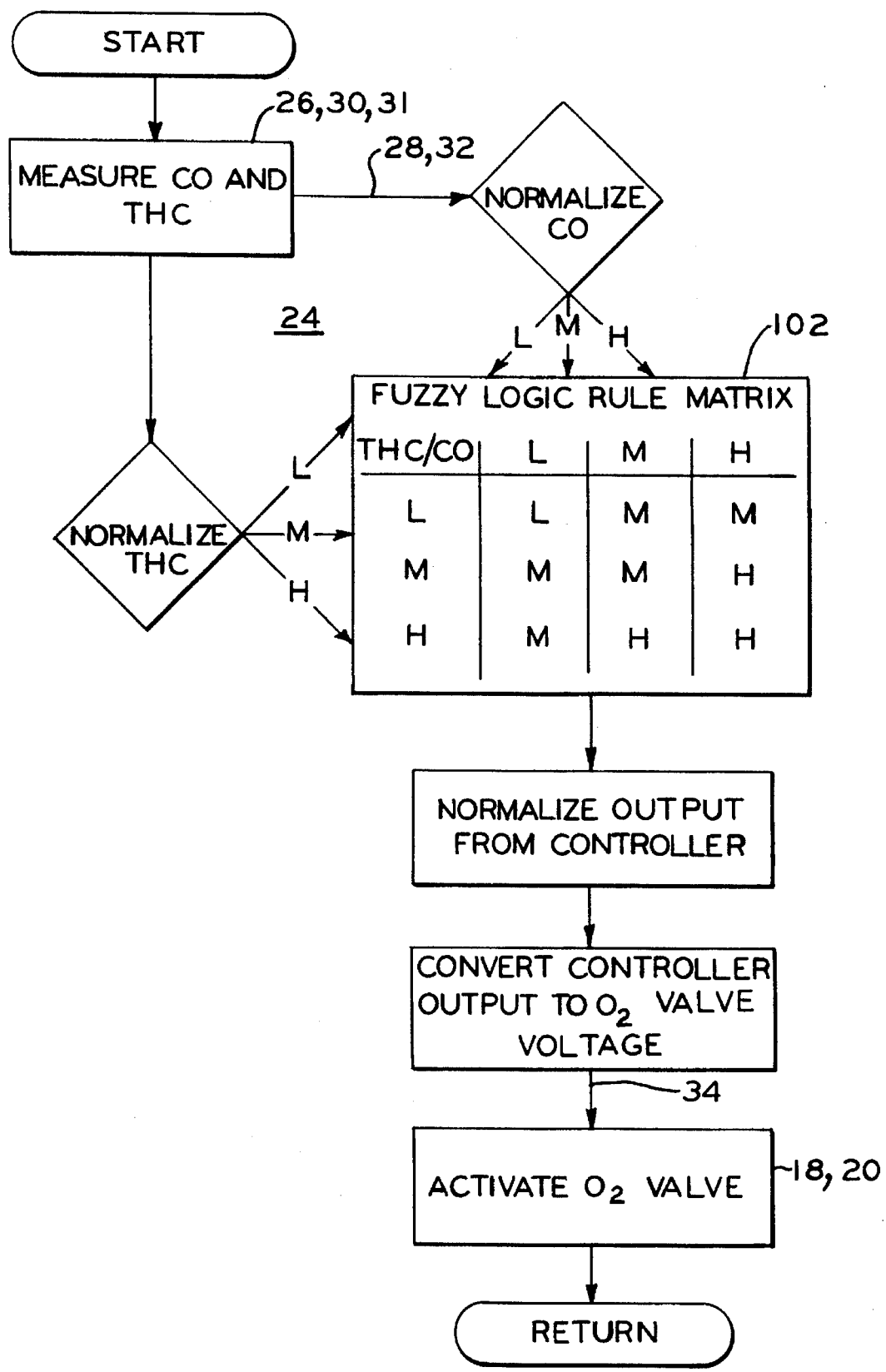
FIG_3

INTELLIGENT AFTERBURNER INJECTION CONTROL TO MINIMIZE POLLUTANT EMISSIONS

BACKGROUND OF INVENTION

Afterburners (or secondary combustion chambers) are required for hazardous waste incineration units and kilns operating in this country to ensure the destruction of organic compounds which may be a result of incomplete combustion in the primary chamber of an incinerator. The afterburners are often as large or larger than the primary incineration chamber itself, and their operation can require a significant portion of the incinerator's fuel and operating costs. The batch or irregular charging or insertion of pollutants in wastes of varying types and varying amounts into the primary chamber of the incinerator can result in large transient "puffs" of incompletely combusted organic materials from the incinerator or kiln primary combustion chamber into the afterburner. The currently accepted practice requires an afterburner to provide an average residence time of 2 seconds at an average temperature of 1800° F. Since proper mixing is a critical element of a well-operated incinerator, this approach does not guarantee the complete destruction of all products of incomplete combustion (PICs) during these transient excursions, and at the same time requires excess heating during periods when low levels of organic pollutants are present in the gases exiting the primary incinerator chamber.

The transient and unpredictable range of waste properties and pollutant levels leaving the kiln can lead to a lack of oxygen in the afterburner which will cause, among other things, fluctuations in the levels of carbon monoxide and hydrocarbon emissions from the incinerator. One method of overcoming these transient oxygen deficits is to inject oxygen into the afterburner. Oxygen is used rather than air to remove the necessity of heating the four parts of inert nitrogen introduced into the system for every part of oxygen when air is used. However, while the injection of oxygen into the afterburner can significantly reduce the previously described organic emissions, the additional cost of oxygen is too excessive to allow uncontrolled oxygen injection at high enough levels to handle all pollutant fluctuations.

Because it is impossible to accurately predict either the time of occurrence, or the magnitude, or the general shape (including rate of increase and fluctuations) of the transient increases in the emissions of PICs and thus the feed rate or amount of oxygen required, current control systems are forced to continually assume worst-case conditions as a control criteria to maintain acceptable stack emissions. System response to such variables are usually not known or predictable a priori. This leads to actual rates of oxygen injection (and therefore associated costs) which are much higher than the required rates. Traditional feedback controls have been based on the error or difference between a predetermined desired output and actual outputs. The traditional control system's response to such errors is then based upon some mathematical relationship between the measured state of the incinerator and the effects of changing one or more operating parameters. However, this relationship must incorporate detailed knowledge of the physical and chemical mechanisms which govern the behavior of the system. If such mechanisms are not known, the relationship must be significantly simplified, thereby overlooking potentially important effects. Since the relationships between changes in operating parameters and the state of the incineration system are usually not known, traditional control systems must rely on constant operator inputs to maintain the desired conditions within the incinerator. These constant adjustments can result in considerable differences in operation as different operators react to changes within the incinerator, potentially leading to increases in both the emissions of pollutants and the amount of fuel consumed.

Fuzzy logic-based control does not require a priori determination of relationships needed for traditional feedback control systems. Fuzzy logic control rules are based on heuristic operating relationships which are analogous to, and which approach, the intuitive response of a human operator thus providing a more flexible and responsive intelligent feedback control system than is possible with conventional prior art afterburner pollutant control systems. The use of fuzzy logic enables the use of "if-then" rules applied to varying degrees, similar to the way system operators control a system. An operator, rather than using an on-off control approach, may note a low oxygen level and increase oxygen flow "a little bit". Such behavior is simulated by fuzzy logic.

Fuzzy logic provides a less rigid control scheme for control of the incinerator processes that are not easily defined, and provides good control response for unforeseen circumstances that cannot be programmed into a rigid control system design.

The theory of fuzzy logic and an explanation of its ability to be utilized in complex, ill-defined systems, is set forth, for example, in the article "Designing with Fuzzy Logic" by Kevin Self, p. 42, *IEEE Spectrum*, November 1990, which is hereby incorporated by reference. Fuzzy logic has been applied to various complex control systems. Examples include the use of fuzzy logic for optimization of the efficiency of electric motors to reduce electric power consumption by varying the motor speed to match varying load requirements while at the same time minimizing power input. See U.S. Pat. No. 5,272,428 entitled "Fuzzy Logic Integrated Control Method and Apparatus to Improve Motor Efficiency, of Paul J. Chappell and Ronald J. Spiegel, assigned to the same assignee as the present patent application, and hereby incorporated by reference.

OBJECTS AND SUMMARY OF INVENTION

It is an object of the present invention to provide an improved incinerator control system to reduce pollutant emissions.

It is another object of the present invention to provide an improved incinerator control system which is capable of reducing pollutant emissions in an efficient and economical manner.

It is yet another object of the present invention to provide an improved incinerator control system incorporating fuzzy logic for controlling the injection of a reagent such as oxygen ($O_2$) in the combustion process for the economical reduction of pollutant emissions in an incinerator.

It is a further object of the present invention to provide an improved incinerator control system for the reduction of pollutant emissions from the incineration of wastes of varying amounts and types.

In accordance with one embodiment of the present invention, an intelligent afterburner injection control system is provided to control the rate of oxygen injection into the afterburner of an incinerator or kiln utilizing a primary incinerator and an afterburner. A sensor in the exit passage from the primary incinerator senses the gas phase species (such as carbon monoxide and hydrocarbons) exiting the primary incinerator, and another sensor in the exit passage of the afterburner senses conditions (such as temperature) and gas phase species (such as oxygen) exiting the afterburner to the surrounding atmosphere. Oxygen injection is provided by controlling the flow rate of oxygen into the afterburner through a control valve arrangement responsive to a fuzzy logic controller. The fuzzy logic controller receives control signals from the sensors, and generates an oxygen control signal which varies the afterburner oxygen injection time and rate. The fuzzy logic controller varies the time and rate of oxygen injection in incremental steps for minimum pollutant emissions from the incinerator while at the same time minimizing the amount of oxygen injection required.

The fuzzy logic controller operates in accordance with a fuzzy logic rule base utilizing the sensor signals as inputs and providing control signals as outputs.

DESCRIPTION OF INVENTION

FIG. 1 is schematic or block diagram showing the present invention.

FIG. 2 is a block diagram showing details of the fuzzy logic controller of FIG. 1.

FIG. 3 is the fuzzy logic flow chart including a fuzzy logic rule base utilized in the fuzzy logic controller in FIGS. 1 and 2.

Referring to FIG. 1, primary combustion chamber 1 includes rotary kiln 2 into which waste or other material 3 containing pollutants is periodically dispensed by control 5 into the rotary kiln where it is incinerated by main burner 4. Exhaust gases 7 from rotary kiln 2 pass through kiln exit passage 6 to second combustion chamber or afterburner chamber 10 for incineration by afterburner 12 after which cleaned flow 9 exits stack 14 into surrounding atmosphere 11. Oxygen means 19 includes oxygen supply 16, oxygen control 18, oxygen control valve 20, and oxygen injector 22 and allows for the injection of oxygen into the afterburner in the amount and duration called for by the control signals provided by fuzzy logic controller 24. The oxygen flow rate control valve 20 may be, for example, a mass flow controller such as the type sold by Porter Instrument Company as their Valve Model Number 203A.

A first sensor or sensors 26 senses gas phase species of pollutants such as unburned hydrocarbons and/or carbon monoxide exiting rotary kiln 2. A second sensor or sensors 30 positioned in stack 14 senses gas phase species such as the oxygen level in cleaned flow 9 exiting afterburner 10. Sensor 31 located within stack 14 or at the exit of the stack may be utilized in combination with, or in lieu, of sensor or sensors 30 at the stack input. Sensors 26, 30 and 31 may be of the types listed in Table 1 below which indicates the gas phase species (variables) being sensed, the manufacturer, and the manufacturers model number or designation.

TABLE 1

| Variable | Equipment |
|---|---|
| $O_2$ | Beckman 755 Paramagnetic $O_2$ Analyzer |
| $CO_2$ | Horiba PIR-2000 NDIR $CO_2$ Analyzer |
| CO | Horiba PIR-2000 NDIR CO Analyzer |
| NO | TECO Model 10-A Chemiluminescent NO Analyzer |
| THC | Beckman Model 402 THC Analyzer |

As indicated by Table 1, any or all of the following variables may be used as control variables as measured by first sensor(s) 26 at the exit of rotary kiln 2 and/or as measured by second sensor(s) 30, 31: oxygen ($O_2$), carbon dioxide ($CO_2$), carbon monoxide (CO), oxides of nitrogen ($NO_x$), or hydrocarbons (THC). Temperature measurements at sensor locations 26, 30, and 31 or at other locations throughout the system may also be used as control variables.

The upstream control signal 28 from sensor 26 and downstream control signal 32 from stack sensors 30 and/or 31 are provided as inputs to fuzzy logic controller 24 and are used to generate control valve signal 34. The operation of oxygen control 18 is varied to minimize pollutant emission in clean flow 9, while at the same time minimizing the amount of oxygen 16 injected through injector 22 into afterburner 10 and hence minimizing fuel and system operating costs.

Further details of control system 130 and fuzzy logic controller 34 are shown in FIGS. 2 and 3. Referring to FIGS. 2 and 3, The fuzzy logic fundamental rule base 102 for fuzzy logic controller 24 as shown in FIG. 2 is:

IF (THC_ABinlet IS LOW) AND (CO_ABinlet IS LOW)
  THEN $O_2$inject = LOW
IF (THC_ABinlet IS LOW) AND (CO_ABinlet IS MEDIUM)
  THEN $O_2$inject = MEDIUM
IF (THC_ABinlet IS LOW) AND (CO_ABinlet IS HIGH)
  THEN $O_2$_inject = MEDIUM
IF (THC_ABinlet IS MEDIUM) AND (CO_ABinlet IS LOW)
  THEN $O_2$inject = MEDIUM
IF (THC_ABinlet IS MEDIUM) AND (CO_ABinlet IS MEDIUM) THEN $O_2$_inject = MEDIUM
IF (THC_ABinlet IS MEDIUM) AND (CO_ABinlet IS HIGH)
  THEN $O_2$inject = HIGH
IF (THC_ABinlet IS HIGH) AND (CO_ABinlet IS LOW)
  THEN $O_2$inject = MEDIUM
IF (THC_ABinlet IS HIGH) AND (CO_ABinlet IS MEDIUM)
  THEN $O_2$inject = HIGH
IF (THC_ABinlet IS HIGH) AND (CO_ABinlet IS HIGH)
  THEN $O_2$_inject = HIGH Where:
  THC_ABinlet is total hydrocarbons at the afterburner inlet as measured by sensor 26;
  CO_ABinlet is carbon monoxide at the afterburner inlet as measured by sensor 26,
  $O_2$_inject is the amount of oxygen to inject through injector 22 from oxygen supply 16.

This is presented in tabular form as shown in FIG. 3 as follows:

| THC\CO | Low | Medium | High |
|---|---|---|---|
| Low | Low | Medium | Medium |
| Medium | Medium | Medium | High |
| High | Medium | High | High |

As discussed above, other sensed variables may be utilized in place of, or in combination with, THC_AB inlet and CO_AB inlet, including measurements by sensors 26, 30, and 31 of gas phase species such as carbon dioxide, carbon monoxide, oxides of nitrogen and/or hydrocarbons.

The gas concentrations sensed by sensors 26, 30, and 31 are first compared to specified desired levels. Then the fuzzy logic rule base is implemented, and depending on the levels of the gas concentrations (high, medium, or low) the appropriate oxygen injection level is determined.

The oxygen control valve 20 is actuated to control the oxygen so that the best transient response is achieved. This process is continued during the operation of the system to maintain the most efficient and effective oxygen level as determined by the controller in direct response to the pollutant levels.

It is desirable to use just a few rules with fuzzy logic from a cost and complexity standpoint. The table set forth above provides a rule base useful in a preferred embodiment of the invention, and is a simplified suitable rule base for use in fuzzy logic controller 24. Specific applications of the fuzzy logic may require refinements to this fundamental rule base to match control requirements for desirable operation. For example, the controller may incorporate oxygen levels at the stack as an input in conjunction with the previously discussed pollutants to achieve efficient oxygen injection levels.

The fuzzy variables are defined by the linguistic levels low, medium and high. If additional fuzzy levels are desired or required, they can include any of a spectrum of linguistic combinations, such as very high, extremely low, and so forth.

In fuzzy logic controller 24, a fuzzy rule base consisting of several linguistic rules or membership functions is employed. Also, additional levels could be constructed for the fuzzy control variable(s). Very high (or any of the other membership functions) may, of course, vary from system to system in order to tailor the control to the specific system.

Triangular membership functions and the SUP-MIN composition method for inference and centroid defuzzification could be utilized. Other similar membership functions, inference methods, and defuzzification approaches such as the height method could be used. See the aforementioned article "Designing with Fuzzy Logic" by Kevin Self.

Referring next to FIG. 2, database 100 includes the necessary information regarding the incinerator parameters or other pertinent data. Rule base 102 includes the type of fuzzy logic relations or basic operation, to provide fuzzy rules, algorithms, and composition for computer language functions such as maximum, minimum, minus, and if-then-else. "Fuzzification" stage 104 represents the process measurements as fuzzy singletons, such as high, medium, and low. "Defuzzification" stage 106 converts fuzzy outputs to real numbers. The most common procedure for this conversion is the center of area method, much like that used for calculating centroids of various combined areas. The computation unit 110 represents microprocessor functions for interfacing and recalculation. The computation unit 110 handles complex, real-time computation related to database 100.

Pollutant control systems of FIG. 1 incorporating fuzzy logic control can be readily retrofitted or added onto existing incinerators, or incorporated as part of a new incinerator system design and manufacture. This will improve the efficiency of oxygen injection systems in incinerator systems, such as those shown in FIG. 1.

Unlike most control systems which operate on the principle of control action based upon a specific mathematical model of the incinerator, including pertinent incinerator and afterburner parameters, fuzzy logic involves a decision making process which can handle input data that are imprecisely stated. This is unlike the precise "on" or "off" control provided, for example, by a thermostat in a temperature control system. The present invention utilizing fuzzy logic can handle imprecise rules or control input information expressed by terms such as "high", "medium", and "low" as discussed above.

The fuzzy logic controller uses oxygen and pollutant levels and determines whether the control signal should be modified. Subsequent perturbations in the incinerator system 1 will result in subsequent changes to the control system including the fuzzy logic controller 24 to readjust the oxygen input into the afterburner in incremental steps to control the pollutant levels with minimum oxygen input.

By way of a general summary of the operation of the present invention, and referring to FIGS. 1–3, the fuzzy logic controller 24 is provided with a plurality of signals 28 and 32 which are responsive to system operating characteristics to provide a control valve signal to the oxygen control 18. Fuzzy logic controller 24 varies the oxygen supplied to afterburner 10 to control the various pollutants emitted within preset limits while at the same time minimizing the oxygen supplied to the system.

One important additional advantage of the subject invention which becomes apparent is that the oxygen efficiency control can be provided based on response to afterburner 10 operating characteristics only by sensing the inputs and outputs of the afterburner. As a result, the fuzzy logic controller 24 can be designed and manufactured as part of the incinerator system 1 to be essentially independent of the operating characteristics of rotary kiln 2 or the incinerator to which the system is applied. It also simplifies the retrofitting of incinerator systems.

While the present invention has been described in respect to certain preferred embodiments thereof, it is to be understood that numerous variations in details of construction, the arrangement and combination of parts, and the type of materials used may be made without departing from the spirit and scope of the invention.

What we claim is:

1. An intelligent afterburner oxygen injection control system for injecting oxygen from an oxygen supply to minimize oxygen requirements while minimizing large transient pollutant emissions in an incinerator utilizing a primary incinerator and an afterburner for incineration of pollutant beating materials and suitable for retrofitting into existing incinerators comprising:

at least one first sensor positioned to sense levels of pollutants exiting said primary incinerator to said afterburner to generate a primary control signal;

at least one second sensor to sense the level of gas phase species exiting said afterburner for exhaust into the surrounding atmosphere to generate a secondary control signal;

oxygen injection means for injecting oxygen into said afterburner;

a control for said oxygen injection means to control the oxygen flow from said oxygen supply to said afterburner; and a fuzzy logic controller receiving said primary and said secondary control signals and for generating an oxygen injection control signal in response thereto;

said oxygen injection control signal varying the amount of said afterburner oxygen injected for minimizing pollutant emissions from said afterburner while at the same time minimizing the amount of oxygen injected.

2. The pollutant control system of claim 1 wherein said oxygen injection means includes a supply of oxygen, a valve, and an oxygen injector, and an oxygen controller for controlling the actuation time and amount of actuation of said valve responsive to said oxygen control system to control the injection of oxygen.

3. The pollutant control system of claim 2 wherein said afterburner is connected through a stack to said surrounding atmosphere and said at least one second sensor in said stack.

4. The pollutant control system of claim 3 wherein said primary incinerator is a rotary kiln.

5. The pollutant control system of claim 3 wherein the pollutant sensed by said at least one first sensor is one or more pollutants selected from the group consisting of the level of unburned hydrocarbons, carbon dioxide, carbon monoxide, and oxides of nitrogen.

6. The pollutant control system of claim 2 wherein said fuzzy logic controller operates to generate said oxygen control signal and the oxygen injection of a variable amplitude and time in accordance with the following rule base:

| $P_1 \backslash P_2$ | Low | Medium | High |
|---|---|---|---|
| Low | Low | Medium | Medium |
| Medium | Medium | Medium | High |
| High | Medium | High | High |

Where:

$P_1$ is a level of first pollutant at said afterburner inlet;

$P_2$ is a level of second pollutant at said afterburner inlet.

7. The pollutant control system of claim 6 where $P_1$ is the total hydrocarbons and $P_2$ is carbon monoxide.

8. The pollutant control system of claim 7 wherein $P_1$ and $P_2$ further include pollutants selected from carbon dioxide, carbon monoxide, unburned hydrocarbons and oxides of nitrogen.

9. The pollutant control system of claim 1 wherein said first sensor is positioned in the emission exit passage from said primary incinerator to generate an oxygen control signal for oxygen injection in accordance with the following rule base:

| THC\CO | Low | Medium | High |
|---|---|---|---|
| Low | Low | Medium | Medium |
| Medium | Medium | Medium | High |
| High | Medium | High | High | where:

THC is total hydrocarbons at said afterburner inlet;

CO is carbon monoxide at said afterburner inlet.

10. The pollutant control system of claim 9 wherein said second sensor is positioned in the emissions exit passage from said afterburner and said second sensor generates and emission signal responsive to at least one pollutant exiting said afterburner.

11. The pollutant control system of claim 10 wherein said second sensor senses pollutants in said stack.

12. The pollutant control system of claim 6 wherein said fuzzy logic controller includes a rule base, a data base, fuzzification stage and a defuzzification stage, and wherein said fuzzy logic controller responds to said levels of pollutants and utilizes said rule base to generate said oxygen control signal to minimize the amount of oxygen required while minimizing said pollutant levels.

13. The pollutant control system of claim 1 wherein said at least one sensor senses the levels of total hydrocarbons and the level of carbon monoxide.

14. The pollutant control system of claim 13 wherein said fuzzy logic controller operates to generate said oxygen control signal.

* * * * *